US012608394B2

(12) United States Patent
Samel et al.

(10) Patent No.: US 12,608,394 B2
(45) Date of Patent: Apr. 21, 2026

(54) COMPREHENSIVE DATA INTEGRATION IMPLEMENTING SEAMLESS EXTRACTION, LOADING AND TRANSFORMATION OF DATA

(71) Applicant: BANK OF AMERICA CORPORATION, Charlotte, NC (US)

(72) Inventors: Saket Vilas Samel, Maharashtra (IN); Rajneesh Acharya, Princeton Junction, NJ (US); Marlon R. Aguirre, Concord, CA (US); Navdeep Gadhoke, Monmouth Junction, NJ (US); Bindya Jain, Maharashtra (IN); Naveen Kumar Jayaraman, Tamilnadu (IN); Tushar Kale, Westport, CT (US); Ramesh Krishnan, Tamilnadu (IN); Manikandan Madhu, Tamilnadu (IN); Kiranswamy Malemath, Concord, NC (US); Vinay Manhass, Cary, NC (US); Raghavender Singh Panthulu, Telangana (IN); Mandar Parab, Maharashtra (IN); Karthik Rajapalani, Tamilnadu (IN); Siddharthan Sethuraj, Tamilnadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/608,420

(22) Filed: Mar. 18, 2024

(65) Prior Publication Data

US 2025/0291809 A1 Sep. 18, 2025

(51) Int. Cl.
*G06F 16/00* (2019.01)
*G06F 16/25* (2019.01)

(52) U.S. Cl.
CPC ................................. *G06F 16/254* (2019.01)

(58) Field of Classification Search
CPC ...................................................... G06F 16/254
See application file for complete search history.

(56) References Cited

U.S. PATENT DOCUMENTS

| | | | | |
|---|---|---|---|---|
| 8,032,485 | B2 | 10/2011 | Alvarez | |
| 10,325,206 | B2 | 6/2019 | Sanchez | |
| 10,997,195 | B1 * | 5/2021 | Sekar | ..................... G06N 20/00 |
| 11,055,303 | B2 | 7/2021 | Reiner | |
| 11,093,318 | B2 | 8/2021 | Madera | |

(Continued)

*Primary Examiner* — Syed H Hasan
(74) *Attorney, Agent, or Firm* — Moore & Van Allen PLLC; Nicholas C. Russell

(57) ABSTRACT

A comprehensive/unified platform for data integration/processing including building/generating and managing data applications is disclosed. The data integration platform takes a modular approach such that new functionality can easily be added to the platform as future needs dictate. In this regard, the data integration platform includes modules for data ingestion, data transformation, data loading/storage, data analytics and the like that provide end-to-end functionality. The data integration platform provides for unified data operations capabilities, including data governance, data quality control, data control and data lineage. The data integration platform may leverage the use AI including ML, such as generative AI to facilitate the capturing of metadata, enhancing/improving captured data, and assisting in data analytics.

19 Claims, 7 Drawing Sheets

(56) References Cited

U.S. PATENT DOCUMENTS

| | | | | |
|---|---|---|---|---|
| 11,250,344 | B2 | 2/2022 | Maurya | |
| 11,366,824 | B2 | 6/2022 | Jacob | |
| 11,574,215 | B2 | 2/2023 | Zeng | |
| 11,580,149 | B2 | 2/2023 | Yu | |
| 11,587,012 | B2 | 2/2023 | Ramchandran | |
| 11,675,921 | B2 | 6/2023 | Arthur | |
| 11,829,368 | B2 | 11/2023 | Colcord | |
| 12,169,502 | B1 * | 12/2024 | Abraham | G06F 16/258 |
| 2014/0007132 | A1 * | 1/2014 | Gaxiola | G06F 9/5083 |
| | | | | 718/105 |
| 2014/0143186 | A1 | 5/2014 | Bala | |
| 2015/0121280 | A1 | 4/2015 | Slatner | |
| 2017/0017913 | A1 | 1/2017 | Bharti | |
| 2017/0068891 | A1 | 3/2017 | Shironoshita | |
| 2017/0098002 | A1 | 4/2017 | Byrnes | |
| 2018/0052897 | A1 | 2/2018 | Namarvar | |
| 2019/0286620 | A1 * | 9/2019 | Al-Haimi | G06F 16/211 |
| 2021/0192389 | A1 * | 6/2021 | Guan | G06F 16/215 |
| 2021/0264312 | A1 | 8/2021 | Sarferaz | |
| 2022/0328164 | A1 * | 10/2022 | Rogers | G16H 30/20 |
| 2022/0405294 | A1 * | 12/2022 | Padbidri | G06F 16/254 |
| 2023/0350862 | A1 | 11/2023 | Munuri | |
| 2024/0004962 | A1 | 1/2024 | Vakada | |
| 2024/0004963 | A1 | 1/2024 | Nouri | |
| 2024/0020292 | A1 | 1/2024 | Sehra | |
| 2024/0134875 | A1 * | 4/2024 | Diagarajan | G06F 16/214 |
| 2025/0060998 | A1 * | 2/2025 | Phanishayee | G06F 9/5072 |

* cited by examiner

300

200

COMPUTING PLATFORM 300

MEMORY 302

DATA INTEGRATION PLATFORM 100

DATA OPERATIONS CAPABILITIES (DataOps) 160

| DATA GOVERNANCE 160-1 | DATA QUALITY CONTROLS 160-2 | DATA CONTROLS 160-3 | DATA LINEAGE 160-4 | DATA VALIDATION 160-5 |

USER INTERFACE (UI) MODULE 110

USER INPUTS 112

METADATA 114   SET DATA 116

| DATA INGESTION 114-1 | DATA TRANSFORMATION 114-2 |
| DATA ANALYTICS 114-4 | DATA STORAGE/LOADING 114-3 |

DATA INGESTION MODULE 120   INTAKE/INGESTION 122   METADATA 114   SET OF DATA 116

DATA TRANSFORMATION MODULE 130

RULES ENGINE 132   TRANSFORMATION RULES 134

SET OF DATA 116 > METADATA 114 LOGIC 136 TRANSFORMATION RULES 134 > TRANSFORMATION OUTPUT 138

DATA STORAGE MODULE 140   ORGANIZE/STORE/ 142   SET OF DATA 116   TRANSFORMATION OUTPUT 138

DATA ANALYTICS MODULE 150

DATA ANALYSIS 152   AI 154   ML MODEL(S) 156   TRANSFORMATION OUTPUT 138

COMPUTING PROCESSOR DEVICE(S) 304

FIG. 2

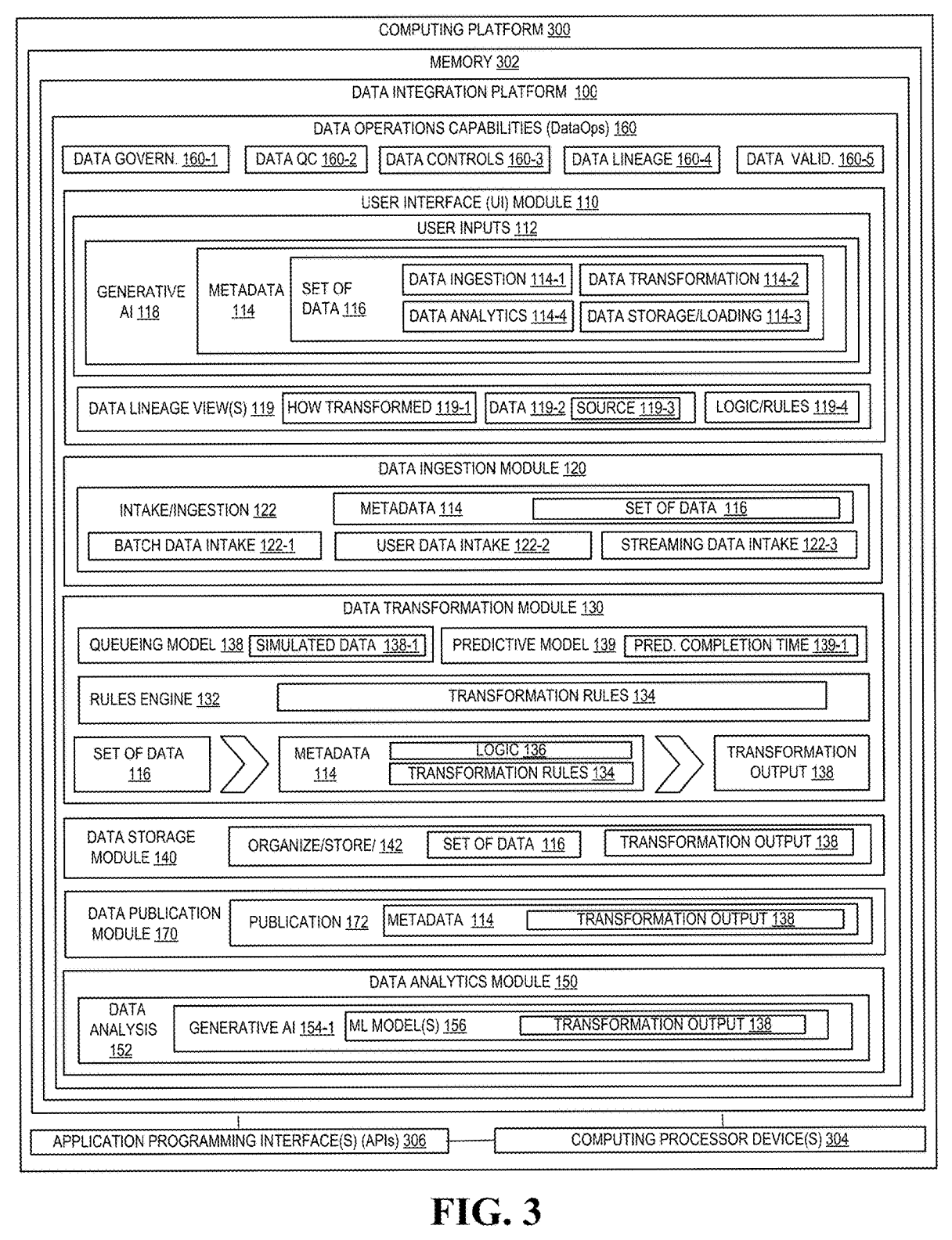

COMPUTING PLATFORM 300

MEMORY 302

DATA INTEGRATION PLATFORM 100

DATA OPERATIONS CAPABILITIES (DataOps) 160

| DATA GOVERN. 160-1 | DATA QC 160-2 | DATA CONTROLS 160-3 | DATA LINEAGE 160-4 | DATA VALID. 160-5 |

USER INTERFACE (UI) MODULE 110

USER INPUTS 112

| GENERATIVE AI 118 | METADATA 114 | SET OF DATA 116 | DATA INGESTION 114-1 | DATA TRANSFORMATION 114-2 |
| | | | DATA ANALYTICS 114-4 | DATA STORAGE/LOADING 114-3 |

DATA LINEAGE VIEW(S) 119 | HOW TRANSFORMED 119-1 | DATA 119-2 | SOURCE 119-3 | LOGIC/RULES 119-4

DATA INGESTION MODULE 120

| INTAKE/INGESTION 122 | METADATA 114 | SET OF DATA 116 |
| BATCH DATA INTAKE 122-1 | USER DATA INTAKE 122-2 | STREAMING DATA INTAKE 122-3 |

DATA TRANSFORMATION MODULE 130

| QUEUEING MODEL 138 | SIMULATED DATA 138-1 | PREDICTIVE MODEL 139 | PRED. COMPLETION TIME 139-1 |

| RULES ENGINE 132 | TRANSFORMATION RULES 134 |

| SET OF DATA 116 | > | METADATA 114 | LOGIC 136 | > | TRANSFORMATION |
| | | | TRANSFORMATION RULES 134 | | OUTPUT 138 |

DATA STORAGE MODULE 140 | ORGANIZE/STORE/ 142 | SET OF DATA 116 | TRANSFORMATION OUTPUT 138 |

DATA PUBLICATION MODULE 170 | PUBLICATION 172 | METADATA 114 | TRANSFORMATION OUTPUT 138 |

DATA ANALYTICS MODULE 150

| DATA ANALYSIS 152 | GENERATIVE AI 154-1 | ML MODEL(S) 156 | TRANSFORMATION OUTPUT 138 |

| APPLICATION PROGRAMMING INTERFACE(S) (APIs) 306 | COMPUTING PROCESSOR DEVICE(S) 304 |

FIG. 3

METADATA <u>114</u>

DATA MAP <u>114-A</u>

DATA SOURCES (INTERNAL AND/OR EXTERNAL) <u>114-B</u>

DATA CONNECTIONS (BETWEEN DATA IN THE SET OF DATA) <u>114-C</u>

DATA ACCESS PRIVILEGES <u>114-D</u>

DATA RETENTION PARAMETERS <u>114-E</u>

RULES APPLICABLE TO DATA OPERATIONS CAPABILITIES <u>114-F</u>

OTHER METADATA <u>114-G</u>

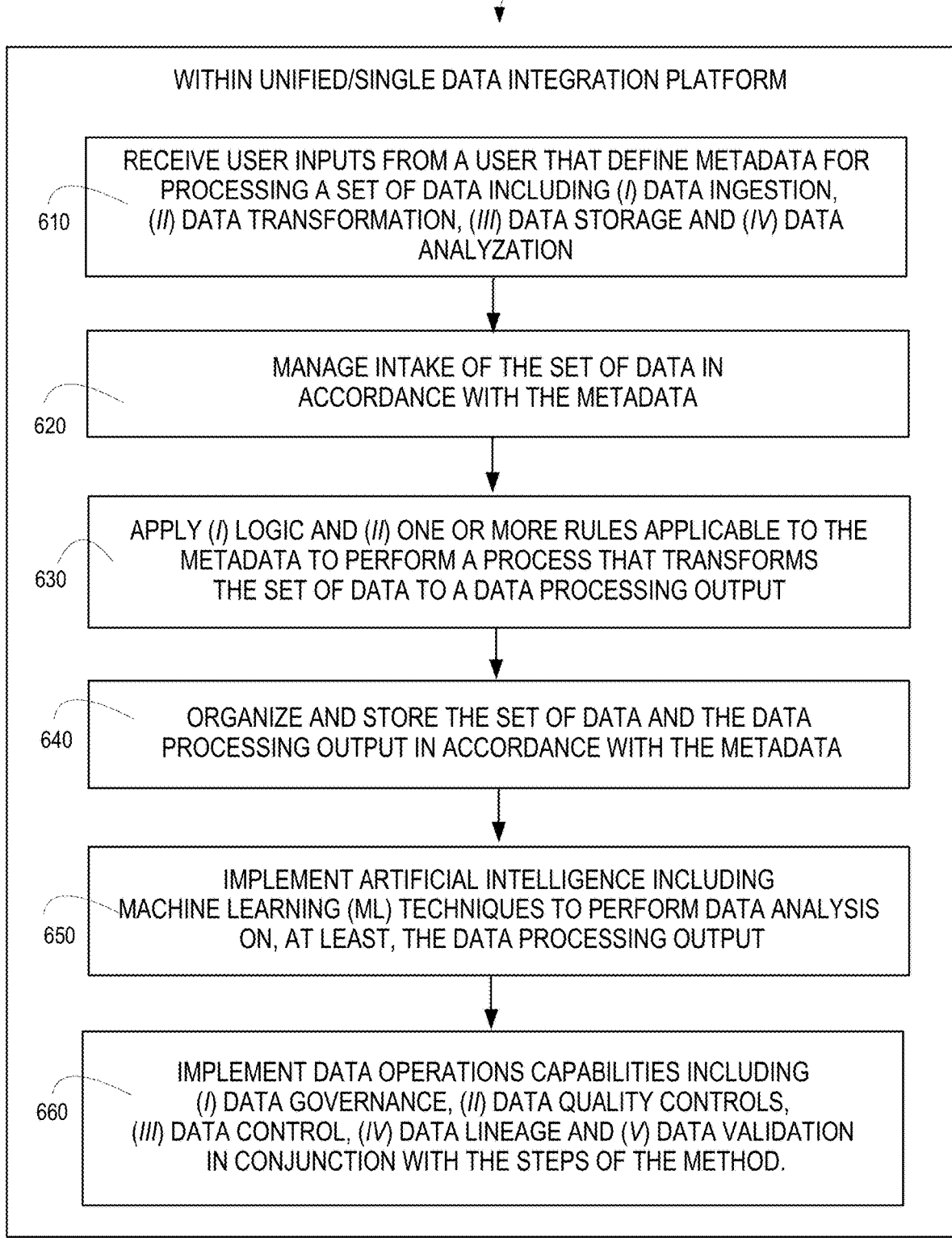

600

WITHIN UNIFIED/SINGLE DATA INTEGRATION PLATFORM

610  RECEIVE USER INPUTS FROM A USER THAT DEFINE METADATA FOR PROCESSING A SET OF DATA INCLUDING (*I*) DATA INGESTION, (*II*) DATA TRANSFORMATION, (*III*) DATA STORAGE AND (*IV*) DATA ANALYZATION

620  MANAGE INTAKE OF THE SET OF DATA IN ACCORDANCE WITH THE METADATA

630  APPLY (*I*) LOGIC AND (*II*) ONE OR MORE RULES APPLICABLE TO THE METADATA TO PERFORM A PROCESS THAT TRANSFORMS THE SET OF DATA TO A DATA PROCESSING OUTPUT

640  ORGANIZE AND STORE THE SET OF DATA AND THE DATA PROCESSING OUTPUT IN ACCORDANCE WITH THE METADATA

650  IMPLEMENT ARTIFICIAL INTELLIGENCE INCLUDING MACHINE LEARNING (ML) TECHNIQUES TO PERFORM DATA ANALYSIS ON, AT LEAST, THE DATA PROCESSING OUTPUT

660  IMPLEMENT DATA OPERATIONS CAPABILITIES INCLUDING (*I*) DATA GOVERNANCE, (*II*) DATA QUALITY CONTROLS, (*III*) DATA CONTROL, (*IV*) DATA LINEAGE AND (*V*) DATA VALIDATION IN CONJUNCTION WITH THE STEPS OF THE METHOD.

FIG. 7

COMPREHENSIVE DATA INTEGRATION IMPLEMENTING SEAMLESS EXTRACTION, LOADING AND TRANSFORMATION OF DATA

FIELD OF THE INVENTION

The present invention is related generally to data integration and processing and, more specifically, a comprehensive/unified modular and highly-scalable data integration platform for data processing that provides for data ingestion, data transformation, data loading/storage and data analytics, which in some instances leverages Artificial Intelligence (AI) including Machine Learning (ML) techniques.

BACKGROUND

Currently, data integration presents many challenges to entities requiring data processing. Numerous applications/tools exist which encompass some, but not all, of the functionality required for data processing. In this regard, separate applications/tools may exist for performing the various components of data processing, such as, data ingestion, data transformation, data loading/storage and data analysis. The problem lies in knowing what combination of these applications/tools to choose for the data processing task at hand. This becomes a daunting undertaking when it unclear as to where the functionality of one application/tool ends and the functionality of another application/tool begins. In addition, when multiple different application/tools are required to complete the entire data integration process, challenges related to ensuring proper updates to applications/tools occur and licensing requirements are adhered to. Moreover, as new applications/tools emerge it is difficult to assess whether the proper applications/tools are being implemented in the data integration process.

In large enterprises or the like with a high volume of data integration/processing needs, these disparate applications/tools result in data processing silos, in which each individual data processing need is addressed with a distinct set of applications/tools. When multiple different applications/tools are incorporated to carry out the same or similar functions it becomes difficult for an enterprise to control data operations, such as, data governance, data quality control, data control and data transparency.

Therefore, a need exists to develop systems, computerized methods, computer program products and the like that will provide a comprehensive/unified solution for data integration. In this regard, the desired systems, methods and the like should provide an integrated platform that provides end-to-end data integration and processing including, but not necessarily limited to, data ingestion, data transformation (i.e., processing the data to an output), data loading/storage, data analytics and the like. Moreover, the desired systems, methods and like, should eliminate the need for separate applications/tools to perform data operational (i.e., DataOps) functions, such as data governance, data quality control, data control, data transparency and the like.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program products and the like that provide a comprehensive/unified platform for data integration/processing including building/generating and managing data applications. The present invention takes a modular approach to data integration/processing such that new functionality can easily be added to the platform as future needs dictate. In this regard, the data integration platform of the present invention includes modules for data ingestion, data transformation, data loading/storage, data analytics and the like that provide end-to-end functionality, including, but not limited to, Extract, Load, Transform (ETL), Extract, Transform, Load (ELT), Change Data Capture (CDC) and the like.

The data integration application of the present invention includes a User Interface (UI) that allows users to effortlessly construct data applications by defining the metadata required for management and processing of the data. The metadata includes, but is not limited to, a detailed map for the data journey including orchestration/coordination of the data processes (i.e., how the data is organized, the setup of the data flow and the like). In this regard, the captured metadata provides the template for end-to-end processing and is relied by all facets of the data integration platform to perform the requisite functions. In specific embodiments of the invention, the capturing of the metadata relies on Artificial Intelligence (AI), such as generative AI or the like such that conversational queries are directed to the user and received from the user to facilitate the capture of the metadata. Moreover, AI, such as generative AI may be used once the data has been transformed to insights into the data processing output and/or correct errors or omissions in the data transformation process.

Moreover, the data integration platform of the present invention provides comprehensive data operations (DataOps) capabilities, including, but not limited to, data governance, data quality control, data control and data transparency/lineage, thereby eliminating the need for separate tools/technologies to perform these functions.

In terms of data ingestion, the data integration platform of the present invention is capable for intaking data of various types from both internal and external sources, such as batch data, user-managed data, streaming data, as well as custom data sources. Once ingested, the data integration platform is capable of convert the data to a format conducive for further data processing/transformation.

Further, in terms of data transformation, the data integration platform is configured to provide execution and workflow management including workload automation (i.e., batch job scheduling) that offers unlimited scalability adapting to growing data processing needs. The data transformation module relies on a powerful rules engine to decouple logic from applications and processes and allows users to intuitively define rules and logically group rules for further processing. In specific embodiments of the invention, AI and ML-based queuing and predictive models are implemented to simulate the wait time for processing outstanding data transformations and predict the time to completion for data transformations currently being processed and data transformation processes awaiting processing. As a result of the time to completion predictions, the invention is able to automatically adjust processing capabilities, such increasing server capacity or the like.

Moreover, in specific embodiments of the invention, the data integration platform of the present invention relies on AI including ML models to provide dynamic analytical capabilities to enhance or otherwise improve the ingested data.

A system for comprehensive data integration defines first embodiments of the invention. The system includes a computing platform (i.e., one and typically more computing devices) having a memory and one or more computing processor devices in communication with the memory. The memory stores a data integration platform that is a modular platform that is highly scalable and is executable by at least one of the one or more computing processor devices. The data integration platform includes a user interface module configured to receive user inputs from a user that define metadata for processing a set of data including (i) data ingestion, (ii) data transformation, (iii) data storage and (iv) data analyzation. Further, data integration platform includes a data ingestion module configured to manage intake of the set of data in accordance with the metadata. In addition, data integration platform includes a data transformation module including a rules engine defining a plurality of rules. The data transformation module is configured to apply (i) logic and (ii) one or more of the plurality of rules applicable to the metadata to perform a process that transforms the set of data to a data processing output. In this regard, the data ingestion and data transformation modules serve to build/generate data applications. Additionally, data integration platform includes a data storage module configured to organize and store the set of data and the data processing output in accordance with the metadata, and a data analytics module comprising Artificial Intelligence (AI) including one or more Machine Learning (ML) models configured to allow the user to perform data analysis on, at least, the data processing output. Moreover, the data integration platform includes data operations capabilities including (i) data governance, (ii) data quality controls, (iii) data control, and (iv) data lineage configured to be implemented throughout the data integration platform.

In specific embodiments of the system, the user interface module includes generative Artificial Intelligence (AI) configured to conversationally facilitate receipt of the user inputs from the user that define the metadata. In other related embodiments of the system, the metadata includes, but is not limited to, one or more of (i) a data map that organizes and coordinates processing the set of data throughout the data integration platform, (ii) data sources, (iii) connections between data in the set of data, (iv) data access privileges, (v) data retention parameters, (vi) rules applicable to the data operations capabilities and the like.

In other specific embodiments of the system, the data ingestion module configured to manage intake of the set of data in accordance with the metadata, wherein the intake includes one or more of (i) batch data intake, (ii) user-managed data intake, (iii) streaming data intake and the like.

In still further specific embodiments of the system, the data transformation module is further configured to manage execution and workflow of the process that transforms the set of data to a data processing output. In other related embodiments of the system, the data transformation module is further configured to use the metadata and logic to generate/build data applications.

In other embodiments of the system, the data transformation module includes a Machine Learning (ML)-based (i) queuing model that is configured to generate simulated data associated with a wait time for processing outstanding sets of data awaiting transformation and (ii) predictive model configured to use, at least, the simulated data to predict a processing completion time for (a) sets of data currently being transformed and (b) sets of data awaiting transformation. In related embodiments of the system, in response to the predictive model predicting the completion time for (a) the sets of data currently being transformed, and (b) the sets of data awaiting transformation, the data transformation module is further configured to adjust a volume of data processing hardware required to complete at least one of (a) the sets of data currently being transformed and (b) the sets of data awaiting transformation within a predetermined time period.

In still further specific embodiments of the system, the data analytics module further includes generative Artificial Intelligence (AI) configured to allow the user to enhance at least one (i) the set of data and (ii) the data processing output and/or perform analytics on the data processing output.

Moreover, in additional embodiments of the system, the data integration platform includes a data publication module configured to manage publication of data processing output in accordance with the metadata.

In other specific embodiments of the system, the user interface module is configured to generate and present one or more data lineage views that indicate (i) how the process that transforms the set of data to the data processing output occurred, (ii) data from the data set used in the process, (iii) a source of the data used in the process, and (iv) the logic and the rules used to perform the process.

A computer-implemented method for comprehensive data integration defines second embodiments of the invention. The computer-implemented method is executed by one or more computing processor devices within a single data integration platform. The method includes receiving user inputs from a user that define metadata for processing a set of data including (i) data ingestion, (ii) data transformation, (iii) data storage and (iv) data analyzation. In addition, the method includes managing intake of the set of data in accordance with the metadata and applying (i) logic and (ii) one or more rules applicable to the metadata to perform a process that transforms the set of data to a data processing output. In this regard, the method builds or otherwise a data application. In addition, the method includes organizing and storing the set of data and the data processing output in accordance with the metadata and implementing Artificial Intelligence including Machine Learning (ML) techniques to perform data analysis on, at least, the data processing output. Further, the method includes implementing data operations capabilities including (i) data governance, (ii) data quality controls, (iii) data control, and (iv) data lineage in conjunction with the steps of the method.

In specific embodiments of the method, receiving the user inputs further includes implementing generative Artificial Intelligence (AI) to conversationally facilitate receipt of the user inputs from the user that define the metadata. In such embodiments of the method, the metadata includes, but is not limited to, one or more of (i) a data map that organizes and coordinates processing the set of data throughout the data integration platform, (ii) data sources, (iii) connections between data in the set of data, (iv) data access privileges, (v) data retention parameters, (vi) rules applicable to the data operations capabilities and the like.

In other specific embodiments of the method, managing the intake of the set of data further includes managing one or more of (i) batch data intake, (ii) user-managed data intake and (iii) streaming data intake in accordance with the metadata.

In still further specific embodiments the method includes implementing a Machine Learning (ML)-based queuing model to generate simulated data associated with a wait time for processing outstanding sets of data awaiting transformation and implementing a ML-based predictive model to predict a processing completion time for (a) sets of data currently being transformed and (b) sets of data awaiting transformation based at least on the simulated data. In such embodiments the method may further include, based on the predicted processing completion time, adjusting a volume of data processing hardware required to complete at least one of (a) the sets of data currently being transformed and (b) the sets of data awaiting transformation within a predetermined time period.

In other specific embodiments the method includes generating and presenting within a user interface one or more data lineage views that indicate at least one of (i) how the process that transforms the set of data to the data processing output occurred, (ii) data from the data set used in the process, (iii) a source of the data used in the process, (iv) the logic and the rules used to perform the process and the like.

A computer program product including a non-transitory computer-readable medium defines third embodiments of the invention. The computer-readable medium includes sets of codes for causing one or more computing devices to (1) receive user inputs from a user that define metadata for processing a set of data including (i) data ingestion, (ii) data transformation, (iii) data storage and (iv) data analyzation (2) manage intake of the set of data in accordance with the metadata, (3) apply (i) logic and (ii) one or more rules applicable to the metadata to perform a process that transforms the set of data to a data processing output, (4) organize and store the set of data and the data processing output in accordance with the metadata, (5) implement Artificial Intelligence including Machine Learning (ML) techniques to perform data analysis on, at least, the data processing output, and (6) implement data operations capabilities including (i) data governance, (ii) data quality controls, (iii) data control, and (iv) data lineage in conjunction with any of the sets of codes.

In specific embodiments of the computer program product, the set of codes for causing the one or more computing devices to receive the user inputs are further configured to cause the one or more computing devices to implement generative Artificial Intelligence (AI) to conversationally facilitate receipt of the user inputs from the user that define the metadata and wherein the metadata includes one or more of (i) a data map that organizes and coordinates processing the set of data throughout the data integration platform, (ii) data sources, (iii) connections between data in the set of data, (iv) data access privileges, (v) data retention parameters and (vi) rules applicable to the data operations capabilities.

In other specific embodiments of the computer program product, the set of codes for causing the one or more computing devices to manage the intake are further configured to cause the one or more computing devices to manage one or more of (i) batch data intake, (ii) user-managed data intake and (iii) streaming data intake in accordance with the metadata.

In still further specific embodiments of the computer program product, the sets of codes further include sets of codes for causing the one or more computing devices to (1) implement a Machine Learning (ML)-based queuing model to generate simulated data associated with a wait time for processing outstanding sets of data awaiting transformation, (2) implement a ML-based predictive model to predict a processing completion time for (a) sets of data currently being transformed and (b) sets of data awaiting transformation based at least on the simulated data, and (3) based on the predicted processing completion time, adjust a volume of data processing hardware required to complete at least one of (a) the sets of data currently being transformed and (b) the sets of data awaiting transformation within a predetermined time period.

Moreover, in other specific embodiments of the computer program product, the sets of codes further comprise a set of codes for causing the one or more computing devices to generate and present within a user interface one or more data lineage views that indicate (i) how the process that transforms the set of data to the data processing output occurred, (ii) data from the data set used in the process, (iii) a source of the data used in the process, and (iv) the logic and the rules used to perform the process.

Thus, according to embodiments of the invention, which will be discussed in greater detail below, the present invention provides a comprehensive/unified platform for data integration/processing including building/generating and managing data applications. The present invention takes a modular approach to data integration/processing such that new functionality can easily be added to the platform as future needs dictate. In this regard, the data integration platform of the present invention includes modules for data ingestion, data transformation, data loading/storage, data analytics and the like that provide end-to-end functionality. Moreover, the data integration platform leverages the use AI including ML, such as generative AI to facilitate the capturing of metadata, enhancing/improving captured data, assisting in data analytics.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
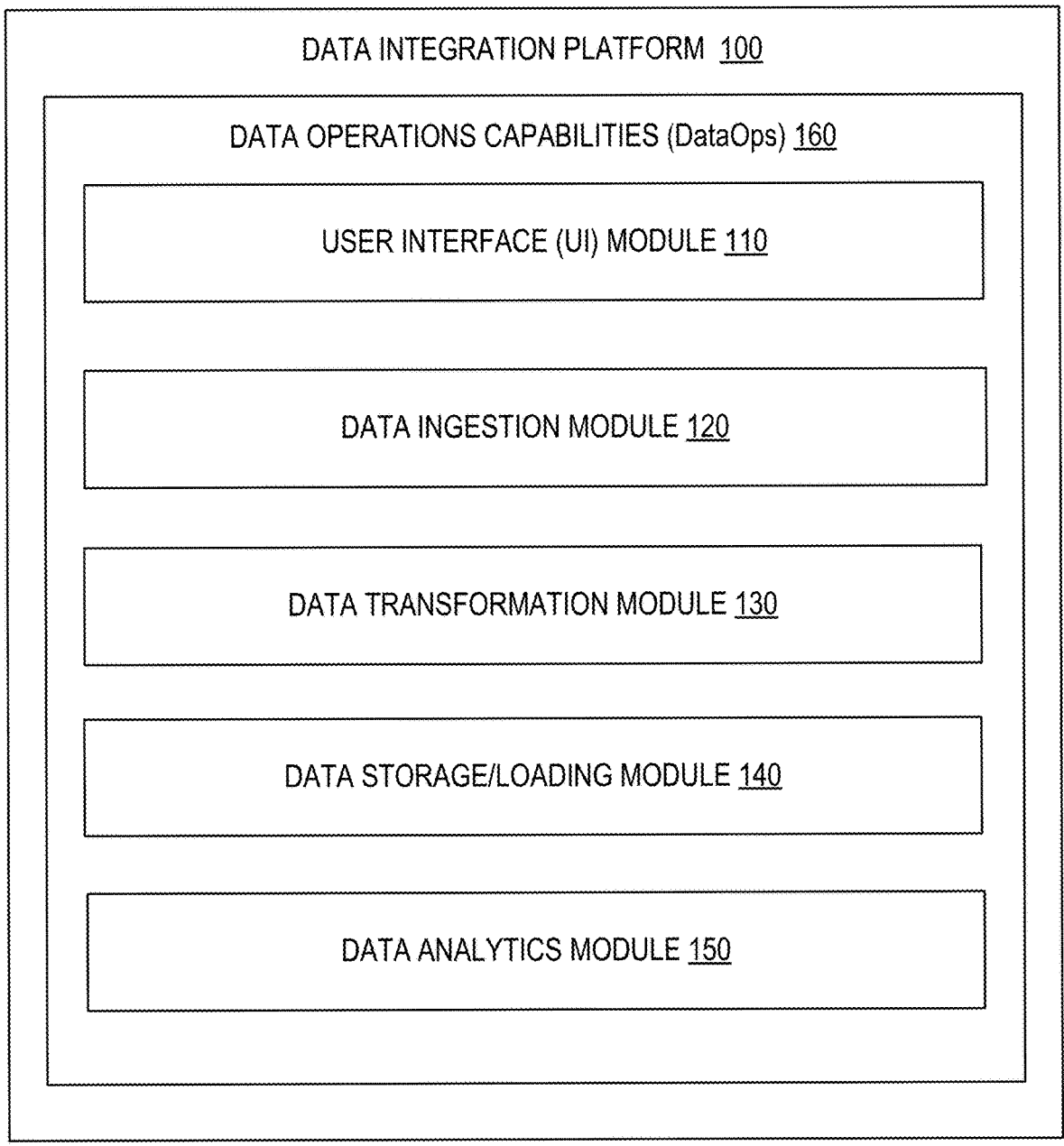
Figure 4:
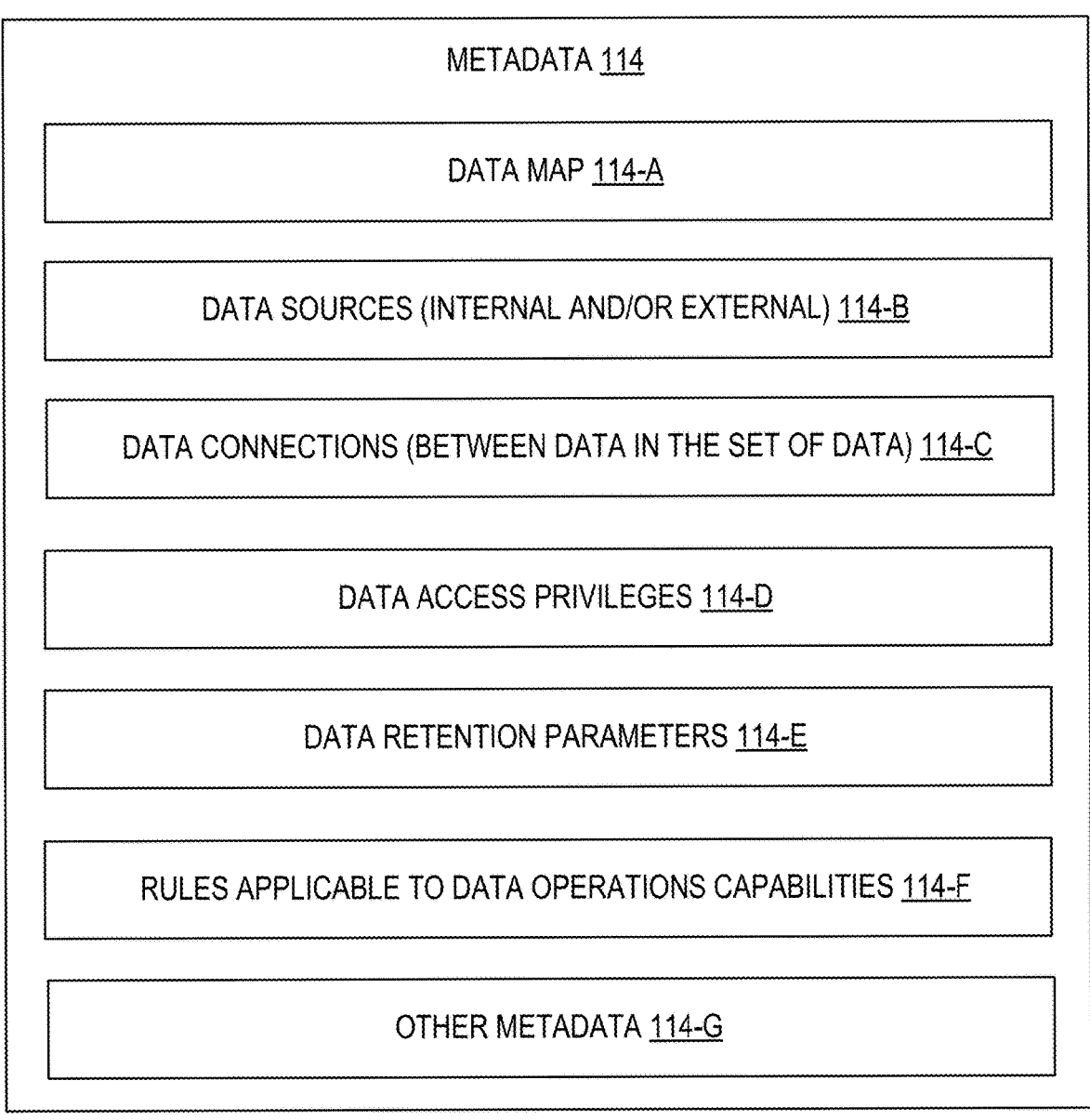
Figure 5:
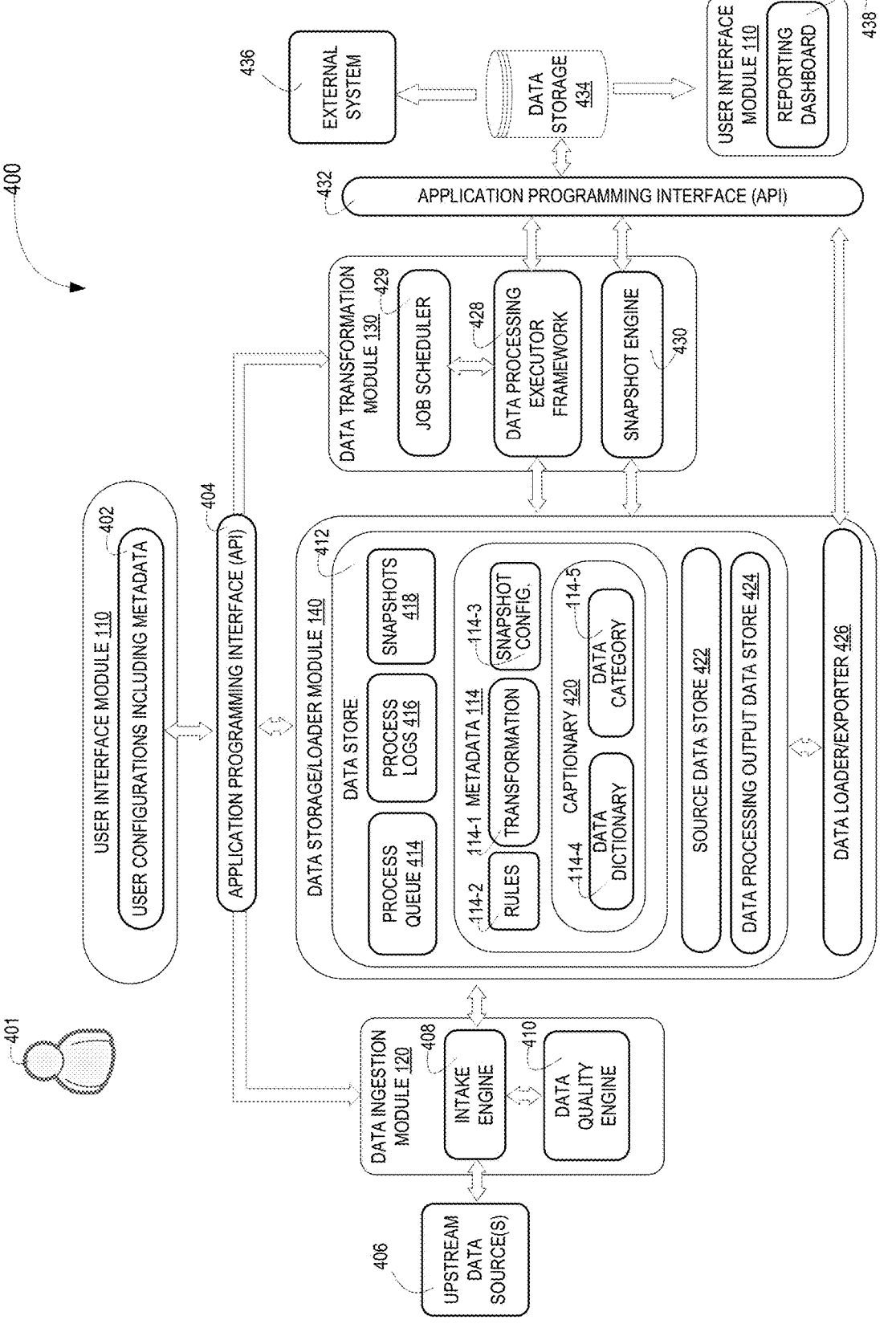
Figure 6:
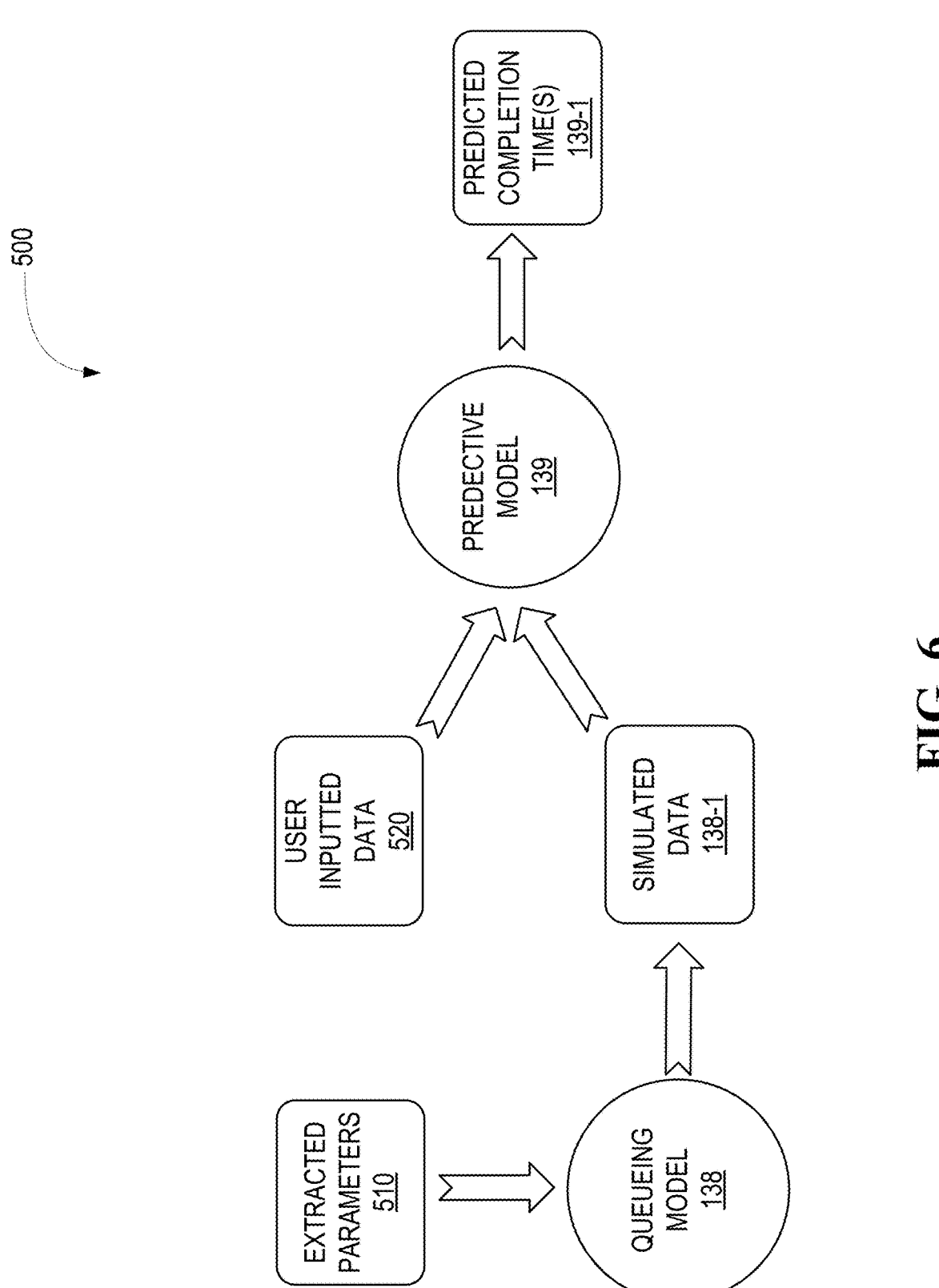

Having thus described embodiments of the disclosure in general terms, reference will now be made to the accompanying drawings, wherein:

FIG. 1 is a block diagram of a data integration platform, in accordance with embodiments of the present invention;

FIG. 2 is a schematic/block diagram of a system for data integration, in accordance with embodiments of the present invention;

FIG. 3 is a block diagram of computing platform including a data integration platform, in accordance with embodiments of the present invention;

FIG. 4 is a block diagram highlighting numerous examples of metadata used in the data integration platform, in accordance with embodiments of the present invention;

FIG. 5 is a block diagram of architecture implemented in a data integration platform, in accordance with embodiments of the present invention;

FIG. 6 is a flow diagram of a method for predicting processing times for data transformation jobs in process and in queue, in accordance with embodiments of the present invention; and FIG. 7 is a flow diagram of a method for comprehensive data integration; in accordance with embodiments of the present invention.

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for a comprehensive/unified platform for data integration/processing including building/generating and managing data applications. Data applications as used herein refers to the process of ingesting raw data from various sources and transforming/processing the data to a meaningful output. The present invention takes a modular approach to data integration/processing such that new functionality can easily be added to the platform as future needs dictate. In this regard, the data integration platform of the present invention includes modules for data ingestion, data transformation, data loading/storage, data analytics and the like that provide end-to-end functionality, including, but not limited to, Extract, Load, Transform (ETL), Extract, Transform, Load (ELT), Change Data Capture (CDC) and the like.

The data integration application of the present invention includes a User Interface (UI) that allows users to effortlessly construct data applications by defining the metadata required for management and processing of the data. The metadata includes, but is not limited to, a detailed map for the data journey including orchestration/coordination of the data processes (i.e., how the data is organized, the setup of the data flow and the like). In this regard, the captured metadata provides the template for end-to-end processing and is relied by all facets of the data integration platform to perform the requisite functions. In specific embodiments of the invention, the capturing of the metadata relies on Artificial Intelligence (AI), such as generative AI or the like such that conversational queries are directed to the user and received from the user to facilitate the capture of the metadata. Moreover, AI, such as generative AI may be used once the data has been transformed to insights into the data processing output and/or correct errors or omissions in the data transformation process.

Moreover, the data integration platform of the present invention provides comprehensive data operations (DataOps) capabilities, including, but not limited to, data governance, data quality control, data control and data transparency/lineage, thereby eliminating the need for separate tools/technologies to perform these functions.

In terms of data ingestion, the data integration platform of the present invention is capable for intaking data of various types from both internal and external sources, such as batch data, user-managed data, streaming data, as well as custom data sources. Once ingested, the data integration platform is capable of converting the data to a format conducive for further data processing/transformation.

Further, in terms of data transformation, the data integration platform is configured to provide execution and work-flow management including workload automation (i.e., batch job scheduling) that offers unlimited scalability adapting to growing data processing needs. The data transformation module relies on a powerful rules engine to decouple logic from applications and processes and allows users to intuitively define rules and logically group rules for further processing. In specific embodiments of the invention, AI and ML-based queuing and predictive models are implemented to simulate the wait time for processing outstanding data transformations and predict the time to completion for data transformations currently being processed and data transformation processes awaiting processing. As a result of the time to completion predictions, the invention is able to automatically adjust processing capabilities, such increasing server capacity or the like.

Moreover, in specific embodiments of the invention, the data integration platform of the present invention relies on AI including ML models to provide dynamic analytical capabilities to enhance or otherwise improve the ingested data.

Referring to FIG. 1, a schematic/block diagram is presented of a data integration platform 100, in accordance with embodiments of the invention. The comprehensive nature of the data integration platform 100 eliminates the need to implement various singular tools to conduct the various functions provided by the data integration platform 100. In specific embodiments of the invention, data integration platform 100 is a low-code platform built on a PYTHON® (Python Software Foundation) and QUARTZ® job scheduler (Software AG) framework. The data integration platform 100 enables application developers and application abstractions to accelerate development of data applications, addressing a broader range of real-time and batch use cases. In specific embodiments of the invention, the features and functions of the data integration platform are realized by a modular design, which allows for ease in adding new functionality through addition of new modules and/or modifying existing modules.

As shown in FIG. 1, data integration platform 100 includes user interface module 110 which is configured to present users with the capability to effortlessly build and operationalize data applications. In specific embodiments, user interface module is built using ANGULAR® (Google LLC). Specifically, as discussed in greater detail, infra., the user interface module 110 is configured to receive user inputs that define metadata associated with the various functions of the data integration platform 110.

Data integration platform 100 additionally includes data ingestion module 120 that is configured to ingest/intake a set of data from various data sources in accordance with the defined metadata. In specific embodiments of the invention, data ingestion module 120 or some other module of the data integration platform 100 is configured to reformat and/or convert the ingested data into a standardized format compatible for subsequent data transformation.

In addition, data integration platform 100 includes data transformation module 130 that is configured to transform or otherwise process the data to meaningful data processing output. In specific embodiments, as discussed in greater detail, infra., the data transformation module includes a rules engine defining a plurality of data transformation rules. In such embodiments of the invention, the data transformation module 130 is configured to apply (i) logic and (ii) one or more of the plurality of rules applicable to the metadata to perform a process that transforms the set of data to the data processing output.

Additionally, data integration platform 100 includes data storage/loading module 140 that is configured to store the set of data and/or the data processing output and/or load the set of data and/or data processing output to upstream applications, platforms or the like for further processing/analysis.

Further, data integration platform 100 includes data analytics module 150 that provides in-flight analytical capabilities empowering users to enhance or otherwise refine their data with Artificial Intelligence (AI) algorithms including Machine-Learning (ML) models or the like. Such ML models may be built on TENSORFLOW® (Google Inc.), SCIKIT-LEARN® (Institute of National Research in Computer Science and Automation), SPARKML™ (Apache Software Foundation), PYTHON® or the like.

Moreover, data integration platform 100 includes comprehensive data operations (i.e., DataOps) capabilities 160 including, but not limited to, data governance, data quality control, data control, data transparency and the like across all of the modules 110, 120, 130, 140, 150. The data operations capabilities 160 are made possible to the metadata-driven architecture that enables users to manage the entire data lifecycle from intake (i.e., raw data) to analytics-ready data lakes and/or warehouses.

Referring to FIG. 2, a schematic/block diagram is presented of a system 200 for comprehensive data integration, in accordance with embodiments of the present invention. The system includes computing platform 300, which may comprise one or, typically, multiple computing devices, such as servers, datastores/bases and the like. In those embodiments of the invention, in which computing platform 300 includes multiple computing devices, the system 200 is implemented in conjunction with one or more distributed communication networks (not shown in FIG. 2), such as the Internet, intranet(s), cellular network(s) and the like.

The computing platform 300 includes a memory 302 and one, or typically more, computing processor devices 304 in communication with the memory 302. Memory 302 of computing platform 300 stores data integration platform 100 that is executable by one or more of the computing device processor(s) 304.

As previously discussed in relation to FIG. 1, data integration platform 100 includes a user interface module 110 configured to receive user inputs 112 from a user that define metadata 114 for processing a set of data 116 including metadata related to (i) data ingestion 114-1, (ii) data transformation 114-2, (iii) data storage/loading 114-3 and (iv) data analytics 114-4.

Further, data integration platform 100 includes data ingestion module 120 that is configured to manage the intake/ingestion 122 of a set of data 116 in accordance with the pre-defined metadata 114. In addition, data integration platform 100 includes a data transformation module 130 that includes a rules engine 132 that includes a plurality of transformation rules 134. The transformation module is configured to apply (i) logic 136 and (ii) one or more of the plurality of transformation rules 134 applicable to the metadata 114 to perform a process that transforms the set of data 116 to a data processing output 138.

In addition, data integration platform 100 includes data storage module 140 that is configured to organize and store 142 (and/or load to upstream applications, platforms or the like) the set of data 116 and the data processing output 138 in accordance with the metadata 114. Additionally, data integration platform 110 includes a data analytics module 150 configured to perform data analysis on the transformation output 138, including, but not limited to, implementing Artificial Intelligence (AI) 154 including one or more Machine Learning (ML) models 156 to enrich the transformation output 138 or perform other data analysis 152 functions.

Moreover, data integration platform 100 includes data operations capabilities 160 including (i) data governance 160-1, (ii) data quality controls 160-2, (iii) data control 160-3, and (iv) data lineage 160-4 that are configured to be implemented throughout the entirety of the data integration platform 100.

Referring to FIG. 3, an additional block diagram is presented of the computing platform 300 highlighting various alternate embodiments of the data integration platform 100, in accordance with embodiments of the present invention. As previously discussed in relation to FIG. 2, computing platform 200 may comprise one or multiple computing devices, such as servers, storage devices or the like. As further previously discussed, computing platform 300 includes memory 302, which may comprise volatile and/or non-volatile memory, such as read-only memory (ROM) and/or random-access memory (RAM), EPROM, EEPROM, flash cards, or any memory common to computing platforms. Moreover, memory 302 may comprise cloud storage, such as provided by a cloud storage service and/or a cloud connection service.

Further, computing platform 300 includes one or more computing processor devices 304, which may be an application-specific integrated circuit ("ASIC"), or other chipset, logic circuit, or other data processing device. Computing processor device(s) 304 may execute one or more application programming interface (APIs) 306 that interface with any resident programs, such as data integration platform 100 or the like, stored in memory 302 of computing platform 300 and any external programs. Computing platform 300 may include various processing sub-systems (not shown in FIG. 3) embodied in hardware, firmware, software, and combinations thereof, that enable the functionality of computing platform 300 and the operability of computing platform 300 on a distributed communication network (not shown in FIG. 3), such as the Internet, intranet(s), cellular network(s) and the like. For example, processing sub-systems allow for initiating and maintaining communications and exchanging data with other networked devices. For the disclosed aspects, processing sub-systems of computing platform 300 may include any sub-system used in conjunction with data integration platform 100 and related tools, routines, sub-routines, applications, sub-applications, sub-modules thereof.

In specific embodiments of the present invention, computing platform 300 additionally includes a communications module (not shown in FIG. 3) embodied in hardware, firmware, software, and combinations thereof, that enables electronic communications between components of computing platform 300 and other networks and network devices. Thus, communication module may include the requisite hardware, firmware, software and/or combinations thereof for establishing and maintaining a network communication connection with one or more devices and/or networks.

As previously discussed in relation to FIGS. 1 and 2, memory 302 stores data integration platform 300, which includes a user interface module 110 configured to receive user inputs 112 from a user that define metadata 114 for processing a set of data 116 including metadata related to (i) data ingestion 114-1, (ii) data transformation 114-2, (iii) data storage/loading 114-3 and (iv) data analytics 114-4. As shown in the block diagram of FIG. 4, metadata 114 may include, but is not limited to, a data map 114-A that shows the data journey from intake/ingestion through analytics, including the orchestration/coordination of data flow/transformation; data sources 114-B (both internal and/or external) for acquiring the set of data; data connections 114-C between specific data in the set of data; data access privileges 114-D (who can access what data in the data set and/or outputted data); data retention parameters 114-E (how long the data is required to stored/retained); rules 114-F applicable to data operations capabilities and/or data transformation and other metadata 114-G.

In specific embodiments of the invention, the user interface module 110 includes or otherwise relies on generative Artificial Intelligence (GenAI) 118 to assist in the definition of metadata 114. In specific embodiments of the invention GenAI may be configured to conversationally interact with the user for purposes of receiving the user inputs 112 that define the metadata 114. In this regard, the generative AI 118 may present the user with a series of queries that prompt the user to provide inputs 112 that define the metadata 114. The series of queries may be general queries and/or dynamically determined queries based on previous responses/inputs provided by the user and/or historical data related to the user's previous data integration requests. In other embodiments of the invention, GenAI 118 may be implemented to create/generate or otherwise suggest to the user the metadata 114.

The data integration platform 300 additionally includes data ingestion module 120 that is configured to ingest/intake 122 a set of data 116 from various data sources in accordance with the defined metadata 114. The intake/ingestion 122 may include, but is not limited to, batch data intake 122-1, user data intake 122-2, streaming data intake 123-3 and the like. As previously noted, in specific embodiments of the invention, data ingestion module 120 or some other module of the data integration platform 100 is configured to reformat and/or convert the ingested data into a standardized format compatible for subsequent data transformation.

In addition, data integration platform 300 includes data transformation module 130 that includes a rules engine 132 that includes a plurality of transformation rules 134. The transformation module is configured to apply (i) logic 136 and (ii) one or more of the plurality of transformation rules 134 applicable to the metadata 114 to perform a process that transforms the set of data 116 to a data processing output 138. In specific embodiments of the invention, data transformation module 130 or some other module of the data integration platform 100 includes a queueing model 138 and predictive model 139. The queueing model 138 receives parameters extracted from the module 130, such as rate of incoming data processing/transformation requests, rate of request processing/transformation, number of data transformation instances and the like and outputs simulated data 138-1. In such embodiments of the invention, the simulated data along with user inputted data is fed into the predictive model 139 to predict the time 139-1 to process data transformation currently occurring and awaiting processing (i.e., in the processing/transformation queue). Such predicted processing/wait times are used to adjust the volume of hardware (e.g., servers or the like) required to process/transform the data within required time periods.

In addition, data integration platform 100 includes data storage module 140 that is configured to organize and store 142 (and/or load to upstream applications, platforms or the like) the set of data 116 and the data processing output 138 in accordance with the metadata 114. In alternate embodiments of the invention, data integration platform 100 includes data publication module 170 that is configured to publish 172 the data transformation output 138, in accordance with rules defined in the metadata 114, to requisite entities and/or upstream applications, platforms as identified in the metadata 114.

Additionally, data integration platform 110 includes a data analytics module 150 configured to perform data analysis on the transformation output 138, including, but not limited to, implementing Artificial Intelligence (AI) 154 including one or more Machine Learning (ML) models 156 to enrich the transformation output 138 or perform other data analysis 152 functions. In specific embodiments of the invention, AI 154 may be GenAI 154-1 that is configured to generate further data that enhances the data transformation output 138.

Moreover, data integration platform 100 includes data operations capabilities 160 including (i) data governance 160-1, (ii) data quality control 160-2, (iii) data control 160-3, and (iv) data lineage 160-4 that are configured to be implemented throughout the entirety of the data integration platform 100. Data governance 160-1 refers to the overall management of metadata 114 within the data integration platform 100. The management includes, but is not limited to, metadata change management, assignment of ownership to metadata within data integration platform 100 and the like. In this regard, any modification of metadata may require an approval process by respective data stewards or the like. Data quality control 160-2, which includes data validation ensures that data ingested into the platform (i.e., set of data 116) or produced within the platform (i.e., data transformation output 138) is accurate, consistent, complete (i.e., conforms to predefined standard and/or rules) and/or reliable. Data control 160-3 refers to the mechanisms and processes implemented to manage and regulate access to the data, so as to ensure that the data 116 and output 138 are used appropriately and securely. Managing and regulating access includes, but is not limited to, preventing unauthorized access, alteration and/or destruction of data.

Data lineage 160-4 includes tracking where data came from and how it used in the data transformation process. In specific embodiments of the invention, UI module 110 is further configured to present data lineage views 119 to the user that indicate how the data was transformed 119-1, what data 199-2 was used in the transformation process, where the data used was sourced 119-3 from, logic/rules 119-4 applied at the transformation process and the like.

Referring to FIG. 5, a schematic diagram is presented of architecture 400 of the data integration platform, in accordance with embodiments of the present invention. A user 401 engages user interface module 110 of the data integration platform 100 (shown in FIGS. 1-3) and provides user configurations including metadata 114, which is provided to other modules of the data integration platform via application programming interface 404.

Intake engine 408 of data ingestion module 120 includes various data importers that are configured to source data into the data integration platform from various upstream data sources 406, such as batch data sources, streaming data source, user-managed data sources and the like.

Data storage/loader module 140 includes data store 412 which is configured to store the raw source data in source data source 422 as well as metadata 114. Metadata 114 may include, but is not limited to, transformation/process metadata 114-1 including input definitions, sources of data the process depends on, output definitions and the like, rules metadata 114-2 and snapshot configurate metadata 114-3 including all data sources that included in a given snapshot. Moreover, metadata 114 may include captionary 420, which includes data dictionary 114-4 that includes definitions of all data elements/attributes that need to be sourced into the platform, as well as, definitions for enriched attributes and their respective definitions and data category 114-6 that includes definitions of the tables in the platform and mapping to PDEs (Partial Differential Equations). Data store 412 additionally stores process queue 414 that include transformations awaiting processing, process logs 416 that include details related to processes/transformation that have previously occurred and snapshots 418, which is a collection of active datasets at a given time in the platform.

Data transformation module 130 includes data processing executor framework 428 that is configured to process the jobs/tasks in the process queue based on a QUARTZ® Enterprise job scheduler (Terracota Company) 429. Further, snapshot engine 430 is configured to generate snapshots in accordance with the snapshot configuration metadata 114-3 and store in the snapshots in the snapshot 418 portion of data store 412. In response to data processing executor framework 428 executing a data transformation (i.e., job/tasks), the data processing output/results are stored in data processing output data store 424 of data store 412.

Data storage/loader module 140 additionally includes data loader/exporter 426 that is configured to load data from the data processing output data store 424 to external entities via API 423. API 423 is a REST or data API which, based on the input, dimensions/measures/filters and dynamically provisions the source data and/or the data processing output from the data stores 422, 424 to external entities, such as data storage 434, external systems 436 and reporting dashboard 438 of user interface module 110, which is configured to present reports associated with completed data transformations (i.e., data processing outputs).

Referring to FIG. 6, a flow diagram is presented of a method 500 for predicting completion times for transformations/processes currently being processed as well as those awaiting transformation/processing, in accordance with embodiments of the present invention. Extracted parameters 510, including rate of incoming processing requests, rate of request processing, number of current executor instances and the like are fed into the queueing model 138 which results in simulated data 138-1, which simulates the wait time for a processing request. The simulated data 138-1 and user inputted data 520 are fed into the predictive model 139 which results in predicted completion times 139-1 for transformations (jobs/tasks) currently being processed, as well as those transformations (jobs/tasks) waiting to be performed (i.e., those jobs/tasks in the process queue). Predictive analytic involves analyzing the simulated data and feeding the data to multiple linear regression models. Based on the predicted completion times 139-1, the volume of processing hardware (e.g., servers or the like) may be adjusted to ensure that the transformations (jobs/tasks) currently being processed and/or those awaiting processing completed with a desired timeframe.

Referring to FIG. 7, a flow diagram is depicted of a method 600 for comprehensive data integration, in accordance with embodiments of the present invention. The entire method 600 is conducted within a unified data integration platform, thus eliminating the need for individual tools to perform the comprehensive functions of the data integration platform. At Event 610, user inputs are received from a user that define metadata for processing a set of data. The metadata is related to, but not limited to, (i) data ingestion, (ii) data transformation/processing, (iii) data storage, and (iv) data analytics. In this regard, the metadata includes, but is not limited to, (a) a data map that shows the data journey from intake/ingestion through analytics, including the orchestration/coordination of data flow/transformation; (b) data sources (both internal and/or external) for acquiring the set of data; (c) data connections between specific data in the set of data; (d) data access privileges (who can access what data in the data set and/or outputted data); (e) data retention parameters (how long the data is required to stored/retained); (f) rules applicable to data operations capabilities and/or data transformation and the like. In specific embodiments of the invention GenAI is implemented, such that conversational interactions are held with the user as a means of facilitating the user inputs that define the metadata. Additional, metadata may come from other sources than the user.

At Event 620, intake/ingestion of a set data from data source(s) is managed in accordance with defined metadata. The data sources may include, but are not limited to, batch data sources, streaming data sources, user-managed data and the like. Once intake/ingestion of the data occurs, as part of the overall DataOps capabilities, a quality control check may be performed to ensure the accuracy, validity, consistency, completeness and/or reliability of the data.

At Event 630, logic and rules applicable to the metadata is applied to the set of data to perform one or more processes that serve to transform the set of data to a data processing output. The data integration platform relies on configurable and reusable software application (built on PYTHON®) that utilize the metadata to not only format the data but also process/transform the data. In specific embodiments of the method, the execution and workflow of processes that transform the set are data are managed in accordance with the defined metadata. In further specific embodiments of the invention, ML-based queuing and predictive models are employed to manage the throughput of the various processing/transformation jobs currently being processed/transformed and awaiting processing/transformation (i.e., in queue). The predictive model predicts the time to complete the various processing/transformation jobs currently being processed/transformed and awaiting processing/transformation and is the basis for adjust the current capacity of processing devices (i.e., servers or the like) that need to be implemented.

At Event 640, the set of data and/or data processing output is organized and management of storage occurs in accordance with the metadata. In addition, to storage, loading of the set of data and/or data processing output onto various upstream applications/platforms may be managed in accordance with the metadata. At Event 650, AI including ML techniques are implemented to perform data analysis on the data processing output. In specific embodiments of the invention the AI including ML techniques, which may be GenAI are used to enhance the data processing output.

At Event 660, data operations (i.e., DataOps) capabilities including, but not limited to, (i) data governance, (ii) data quality control, (iii) data control and (iv) data lineage are implemented in conjunction with various portions of Events 610-640.

Thus, present embodiments of the invention discussed in detail above, the present invention provides for a comprehensive/unified platform for data integration/processing including building/generating and managing data applications. The present invention takes a modular approach to data integration/processing such that new functionality can easily be added to the platform as future needs dictate. In this regard, the data integration platform of the present invention includes modules for data ingestion, data transformation, data loading/storage, data analytics and the like that provide end-to-end functionality. Moreover, the data integration platform leverages the use AI including ML, such as generative AI to facilitate the capturing of metadata, enhancing/improving captured data, assisting in data analytics. Further, the data integration platform provides for unified data operations capabilities, including data governance, data quality control, data control and data lineage.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for comprehensive data integration, the system comprising:

a computing platform including a memory and one or more computing processor devices in communication with the memory, wherein the memory stores a data integration platform that is executable by at least one of the one or more computing processor devices and includes:

a user interface module configured to receive user inputs from a user that define metadata for processing a set of data including (i) data ingestion, (ii) data transformation, (iii) data storage and (iv) data analyzation;

a data ingestion module configured to manage intake of the set of data in accordance with the metadata;

a data transformation module includes:

a rules engine defining a plurality of rules, wherein the data transformation module is configured to apply (i) logic and (ii) one or more of the plurality of rules applicable to the metadata to perform a process that transforms the set of data to a data processing output;

a Machine Learning (ML)-based (i) queuing model configured to generate simulated data associated with a wait time for processing outstanding sets of data awaiting transformation based on rate of incoming data transformation requests, rate of request transformation, and number of data transformation instances and (ii) predictive model configured to use, at least, the simulated data to predict a processing completion time for (a) sets of data currently being transformed and (b) sets of data awaiting transformation;

automatically adjust processing capabilities based on at least the predicted processing completion time, wherein the processing capabilities comprise at least increasing a server capacity;

a data storage module configured to organize and store the set of data and the data processing output in accordance with the metadata; and a data analytics module comprising Artificial Intelligence (AI) including one or more Machine Learning (ML) models configured to allow the user to perform data analysis on, at least, the data processing output, wherein the data integration platform includes data operations capabilities including (i) data governance, (ii) data quality controls, (iii) data control, and (iv) data lineage configured to be implemented throughout the data integration platform.

2. The system of claim 1, wherein the user interface module includes generative Artificial Intelligence (AI) configured to conversationally facilitate receipt of the user inputs from the user that define the metadata.

3. The system of claim 1, wherein the user interface module is configured to receive user inputs from the user that define the metadata, wherein the metadata includes one or more of (i) a data map that organizes and coordinates processing the set of data throughout the data integration platform, (ii) data sources, (iii) connections between data in the set of data, (iv) data access privileges, (v) data retention parameters and (vi) rules applicable to the data operations capabilities.

4. The system of claim 1, wherein the data ingestion module configured to manage intake of the set of data in accordance with the metadata, wherein the intake includes one or more of (i) batch data intake, (ii) user-managed data intake and (iii) streaming data intake.

5. The system of claim 1, wherein the data transformation module is further configured to manage execution and workflow of the process that transforms the set of data to a data processing output.

6. The system of claim 1, wherein in response to the predictive model predicting the completion time for (a) the sets of data currently being transformed and (b) the sets of data awaiting transformation, the data transformation module is further configured to adjust a volume of data processing hardware required to complete at least one of (a) the sets of data currently being transformed and (b) the sets of data awaiting transformation within a predetermined time period.

7. The system of claim 1, wherein the data analytics module further includes generative Artificial Intelligence (AI) configured to allow the user to enhance at least one (i) the set of data and (ii) the data processing output.

8. The system of claim 1, wherein the data integration platform further comprises a data publication module configured to manage publication of data processing output in accordance with the metadata.

9. The system of claim 1, wherein the user interface module is configured to generate and present one or more data lineage views that indicate (i) how the process that transforms the set of data to the data processing output occurred, (ii) data from the data set used in the process, (iii) a source of the data used in the process, and (iv) the logic and the rules used to perform the process.

10. A computer-implemented method for comprehensive data integration, the computer-implemented method executed by one or more computing processor devices within a single data integration platform and comprising:

receiving user inputs from a user that define metadata for processing a set of data including (i) data ingestion, (ii) data transformation, (iii) data storage and (iv) data analyzation;

managing intake of the set of data in accordance with the metadata;

applying (i) logic and (ii) one or more rules applicable to the metadata to perform a process that transforms the set of data to a data processing output;

organizing and storing the set of data and the data processing output in accordance with the metadata;

implementing Artificial Intelligence including Machine Learning (ML) techniques to perform data analysis on, at least, the data processing output, wherein implementing further comprises:

generating, using a queuing model, simulated data associated with a wait time for processing outstanding sets of data awaiting transformation based on rate of incoming data transformation requests, rate of request transformation, and number of data transformation instances; and predicting, using a predictive model, a processing completion time for (a) sets of data currently being transformed and (b) sets of data awaiting transformation using the simulated data;

automatically adjusting processing capabilities based on at least the predicted processing completion time, wherein the processing capabilities comprise at least increasing a server capacity; and implementing data operations capabilities including (i) data governance, (ii) data quality controls, (iii) data control, and (iv) data lineage in conjunction with the steps of the method.

11. The computer-implemented method of claim 10, wherein receiving the user inputs further comprises implementing generative Artificial Intelligence (AI) to conversationally facilitate receipt of the user inputs from the user that define the metadata and wherein the metadata includes one or more of (i) a data map that organizes and coordinates processing the set of data throughout the data integration platform, (ii) data sources, (iii) connections between data in the set of data, (iv) data access privileges, (v) data retention parameters and (vi) rules applicable to the data operations capabilities.

12. The computer-implemented method of claim 10, wherein managing the intake of the set of data further comprises managing one or more of (i) batch data intake, (ii) user-managed data intake and (iii) streaming data intake in accordance with the metadata.

13. The computer-implemented method of claim 10, further comprising:

adjusting a volume of data processing hardware required to complete at least one of (a) the sets of data currently being transformed and (b) the sets of data awaiting transformation within a predetermined time period.

14. The computer-implemented method of claim 10, further comprising:

generating and presenting within a user interface one or more data lineage views that indicate (i) how the process that transforms the set of data to the data processing output occurred, (ii) data from the data set used in the process, (iii) a source of the data used in the process, and (iv) the logic and the rules used to perform the process.

15. A computer program product comprising:

a non-transitory computer-readable medium comprising sets of codes for causing one or more computing devices to:

receive user inputs from a user that define metadata for processing a set of data including (i) data ingestion, (ii) data transformation, (iii) data storage and (iv) data analyzation;

manage intake of the set of data in accordance with the metadata;

apply (i) logic and (ii) one or more rules applicable to the metadata to perform a process that transforms the set of data to a data processing output;

organize and store the set of data and the data processing output in accordance with the metadata;

implement Artificial Intelligence including Machine Learning (ML) techniques to perform data analysis on, at least, the data processing output, wherein implementing further comprises:

generating, using a queuing model, simulated data associated with a wait time for processing outstanding sets of data awaiting transformation based on rate of incoming data transformation requests, rate of request transformation, and number of data transformation instances; and predicting, using a predictive model, a processing completion time for (a) sets of data currently being transformed and (b) sets of data awaiting transformation using the simulated data;

automatically adjust processing capabilities based on at least the predicted processing completion time, wherein the processing capabilities comprise at least increasing a server capacity; and implement data operations capabilities including (i) data governance, (ii) data quality controls, (iii) data control, (and iv) data lineage in conjunction with any of the sets of codes.

16. The computer program product of claim 15, wherein the set of codes for causing the one or more computing devices to receive the user inputs are further configured to cause the one or more computing devices to implement generative Artificial Intelligence (AI) to conversationally facilitate receipt of the user inputs from the user that define the metadata and wherein the metadata includes one or more of (i) a data map that organizes and coordinates processing the set of data throughout the data integration platform, (ii) data sources, (iii) connections between data in the set of data, (iv) data access privileges, (v) data retention parameters and (vi) rules applicable to the data operations capabilities.

17. The computer program product of claim 15, wherein the set of codes for causing the one or more computing devices to manage the intake are further configured to cause the one or more computing devices to manage one or more of (i) batch data intake, (ii) user-managed data intake and (iii) streaming data intake in accordance with the metadata.

18. The computer program product of claim 15, wherein the sets of codes further include sets of codes for causing the one or more computing devices to:

adjust a volume of data processing hardware required to complete at least one of (a) the sets of data currently being transformed and (b) the sets of data awaiting transformation within a predetermined time period.

19. The computer program product of claim 15, wherein the sets of codes further comprise a set of codes for causing the one or more computing devices to:

generate and present within a user interface one or more data lineage views that indicate (i) how the process that transforms the set of data to the data processing output occurred, (ii) data from the data set used in the process, (iii) a source of the data used in the process, and (iv) the logic and the rules used to perform the process.

*     *     *     *     *